United States Patent [19]

Janka

[11] Patent Number: 5,077,024
[45] Date of Patent: Dec. 31, 1991

[54] METHOD AND APPARATUS FOR WETTING THE PARTICLES CONTAINED IN A GAS FLOW

[75] Inventor: Pentti Janka, Tampere, Finland
[73] Assignee: Oy Tampella AB, Tampere, Finland
[21] Appl. No.: 473,435
[22] Filed: Feb. 1, 1990
[30] Foreign Application Priority Data
  Feb. 3, 1989 [FI] Finland ................................. 890517
[51] Int. Cl.$^5$ ............................................. B01D 47/00
[52] U.S. Cl. ...................................... 423/244; 55/84; 55/260; 422/247
[58] Field of Search ......................... 55/73, 84, 92, 260, 55/442, 443, 235-238; 261/116; 423/244

[56] References Cited

U.S. PATENT DOCUMENTS

| Re. 16,315 | 4/1926 | Senseman | 55/240 |
| 1,022,496 | 4/1912 | Muller et al. | 55/261 |
| 2,826,264 | 3/1958 | McIlvaine | 55/309 |
| 4,057,602 | 11/1977 | Kolm | 261/DIG. 54 |
| 4,266,951 | 5/1981 | Culvert | 55/84 |

Primary Examiner—Bernard Nozick
Attorney, Agent, or Firm—Dressler, Goldsmith, Shore, Sutker & Milnamow, Ltd.

[57] ABSTRACT

In a method of wetting particles contained in a gas stream including particles and gas, a primary gas stream containing the particles is separated into first and second gas streams such that the first gas stream includes substantially all the particles of the primary gas stream. The particles are wetted in the first gas stream with water in a wetting stage. The amount of water which is introduced into the wetting stage exceeds that amount of water which is capable of reducing the temperature of the first gas stream below its dew point. The resulting first and second gas streams are then combined into an aggregate gas stream downstream of the wetting stage to produce an aggregated gas stream having a temperature greater than the dew point of the aggregated gas.

7 Claims, 1 Drawing Sheet

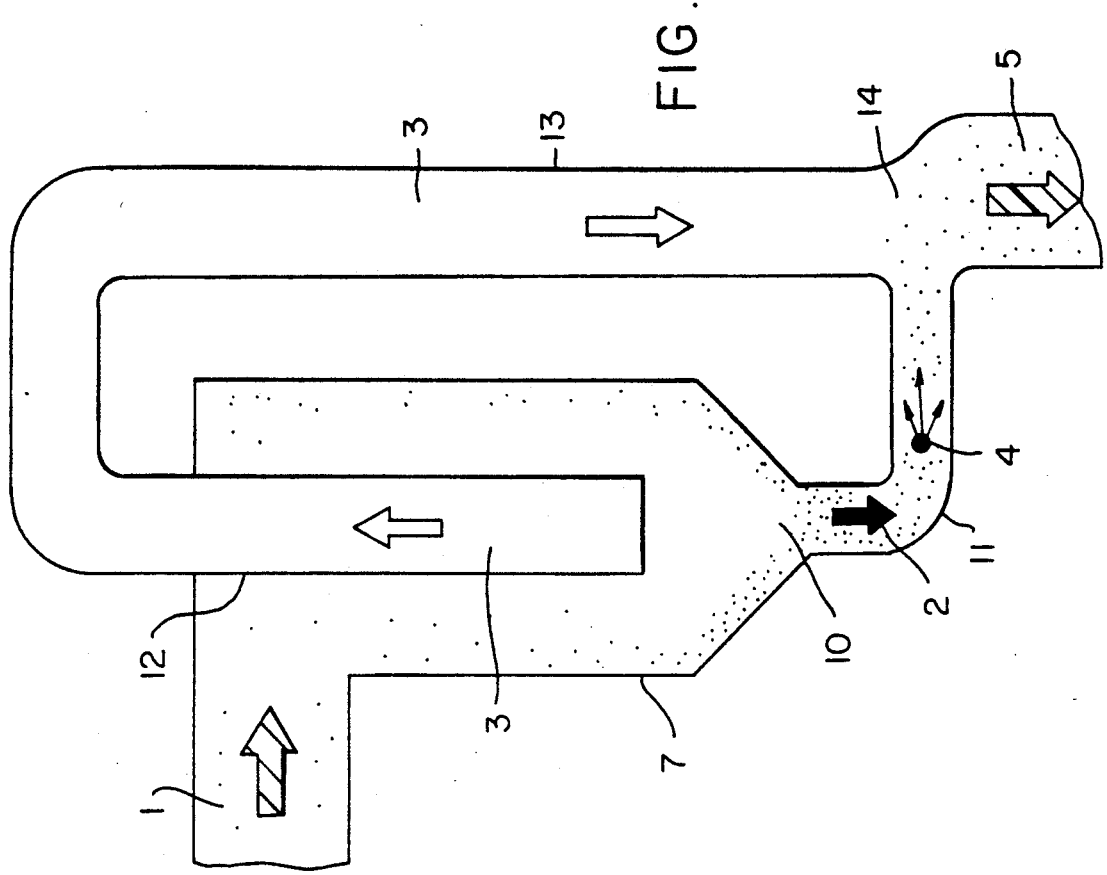
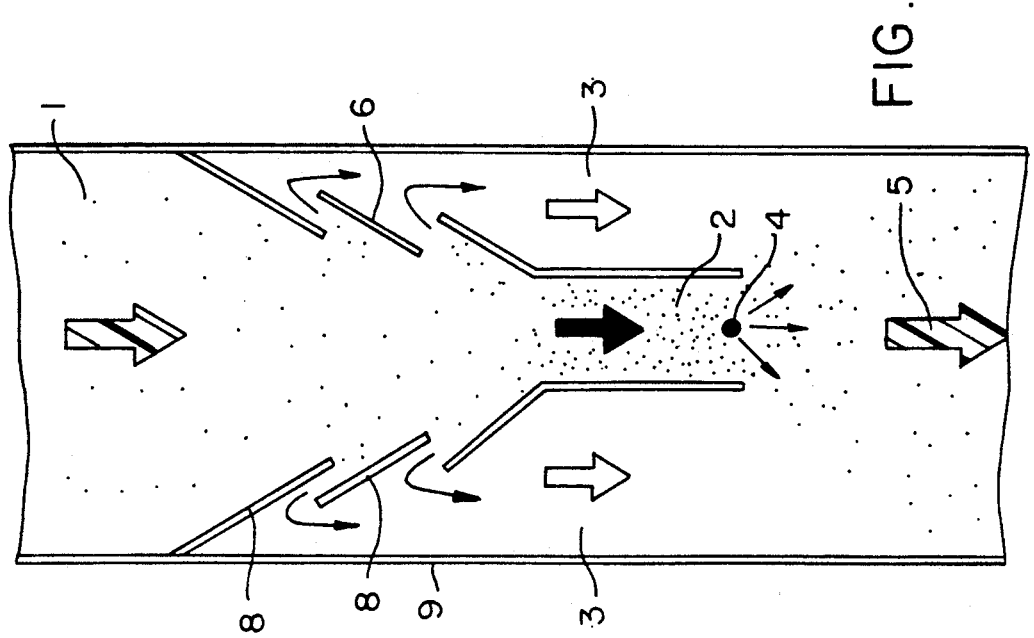

METHOD AND APPARATUS FOR WETTING THE PARTICLES CONTAINED IN A GAS FLOW

BACKGROUND OF THE INVENTION

The present invention relates to a method for wetting the particles contained in a gas flow.

In processes which deal with gas flows containing particles, such as dust, there are several reasons for wetting the particles. Such processes include e.g. increasing the separating capacity of an electric filter and the desulfuration of combustion gases particularly when a gas flow contains alkaline particles, e.g. calcium oxide particles (CaO).

In the presently available methods, a wetting medium, such as water is added in a particles-bearing gas flow in a manner that the entire gas flow is brought under the influence of a wetting medium. Especially when it is not desirable to decrease the temperature of a gas flow, e.g. combustion or flue gases, below the temperature corresponding to the dew point of the gas flow, a problem results from the fact that the particles contained in a gas flow cannot be thoroughly wetted but the wetting thereof remains incomplete. The incomplete wetting is a problem especially in a venturi-type wetting process.

SUMMARY OF THE INVENTION

An object of this invention is to introduce an improved method for wetting the particles contained in a gas flow so that the particles can be wetted completely but, nevertheless, in a manner that other contributing factors having effect on the process, such as temperature corresponding to the dew point of a gas flow, can be made correct for a proper function of the process. In order to achieve this object, a method of the invention is principally characterized in that a first and a second gas flow are separated from the same overall gas flow prior to wetting, the first gas flow substantially including the particles of the overall gas flow which are wetted at a wetting stage and that the first and second gas flows are brought together into a combined gas flow after the wetting stage.

The method is based on the fact that the first gas flow has a relatively high particle density compared to the overall and combined gas flows. The overall gas flow is separated into a partial flow which contains essentially all particles carried in the overall gas flow, the particle density in a thus produced first gas flow being high compared to the overall and combined gas flows. Thus, the amount of wetting medium can considerably exceed that amount of wetting medium which is capable of going below the temperature corresponding to the dew point of the first gas flow. Thus, the first gas flow and particles contained therein can be wetted effectively. If the particles contain alkali oxides, such as calcium oxide (CaO), they are effectively turned into hydroxides, such as calcium hydroxide ((Ca)OH)$_2$). Calcium hydroxide reacts effectively with sulphur dioxide. Following the wetting stage, into the first gas flow is combined a second gas flow which is a partial flow separated from the overall gas flow prior to wetting and which is led to the point of aggregation in a mechanically separated fashion. When the first wetted gas flow and a second gas flow, which is substantially free of particles, are combined or aggregated, the temperature of the aggregate gas flow and other quantities bearing an effect on the process can be made favorable in view of a proper function of the process. Particularly, if temperature of the aggregate gas flow exceeds a temperature corresponding to the dew point of the gas flow, the sulphur retaining reactions occur in the entire gas flow.

The invention relates also to an apparatus for wetting a gas flow which contains particles. The apparatus is principally characterized by comprising means for wetting a first particles-bearing gas flow and means for combining the first particles-bearing, wetted gas flow and a second gas flow which is substantially free of particles.

The use of an apparatus of the invention serves to offer the benefits of the invention.

BRIEF DESCRIPTION OF THE DRAWINGS

The invention will now be described in more detail in the following specification, a few preferred embodiments of the method being described in more detail with reference made to the accompanying drawings. In the drawings FIG. 1 is a schematic view of a first apparatus for use in the application of a method of the present invention and FIG. 2 is another schematic view of a second apparatus for use in the application of a method of the invention.

In FIG. 1 and 2, reference numeral 1 indicates generally an overall gas flow from which is separated a first gas flow 2, which contains substantially all particles of the overall gas flow, and a second gas flow 3 which is substantially free of particles. Furthermore, reference numeral 4 indicates means in connection with the first gas flow passage for wetting the first gas flow. Moreover, an aggregate gas flow comprising a combination of the overall gas flow and the wetting medium is shown with reference numeral 5.

FIG. 1 illustrates an embodiment of the apparatus, wherein the separating means comprises a so-called grid separator 6 and FIG. 2 illustrates an embodiment of the apparatus, wherein the separating means comprises a cyclone separator 7. Both separator means operate on dynamic principle. The degree of separation can range from 50% to 95%. The share of the first gas flow from the overall gas flow can range from 5% to 50%.

The grid separator 6 shown in FIG. 1 comprises plates 8 or the like mounted successively in the direction of flow within the area defined by the cross-section of a flow channel 9, the plates defining a preferably converging passage in the center of the flow channel for the first, particles bearing gas flow. In this context, the grid separator refers to the above plate-like structure which is a so-called dynamic separator whose separating effect is based on a diversion occurring in the gas flow. The second gas flow comprises a flow occurring through the area defined between plates 8 or the like mounted successively in the direction of flow, the second flow being substantially free of particles as a result of the fact that the second gas flow 3 is created as a combination of partial flows running against the direction of flow. In order to achieve a wetting process, a means 4 for wetting the first gas flow is placed in a suitable position in the passage of the first gas flow 2. The injection of a wetting medium, such as water, can be effected by means of one or a plurality of nozzles. The atomization of a wetting medium can be effected by the pressure of a wetting medium or by means of the medium. The first and second gas flows (2, 3) are combined in flow channel 9 downstream of the beam separator, the wetted particles being scattered in aggregate gas flow 5.

FIG. 2 illustrates an embodiment of the method operating also on a dynamic principle by means of a cyclone separator 7 and based on the fact that the bottom section 10 of a cyclone separator is used for discharging a first gas flow 2 which is wetted by using a means 4 located in a flow channel 11 communicating with the bottom section of the cyclone separator. The central tube 12 of the cyclone separator is used for discharging upwards from the cyclone separator the second gas flows 3 along a flow channel 13. The first and second gas flows (2, 3) are combined, for example, in a joint 14 at the bottom section of cyclone separator 7 and advanced further to the following process steps.

The apparatus is based on passing first and second gas flow separated from the overall gas flow separately from each other to the location of building an aggregate gas flow 5. In the case of a grid separator, between flow channel 9 and plates 8 passes a second 3 gas flow while the first one 2 runs between plates 8 past a wetting means 4. In the case of a cyclone separator, a second 3 gas flow is passed to joint 14 along central tube 12 and flow channel 13 while a first 2 gas flow passes into joint 14 from the bottom section of a cyclone separator.

I claim:

1. A method of wetting particles contained in a gas stream including particles and gas, said method comprising the steps of:
   separating a primary gas stream containing said particles into first and second gas streams such that said first gas stream includes substantially all the particles of the primary gas stream;
   wetting the particles in said first gas stream with water in a wetting stage, the amount of water which is introduced into said wetting stage exceeding that amount of water which is capable of reducing the temperature of said first gas stream below its dew point; and
   combining the resulting first and second gas streams into an aggregate gas stream downstream of said wetting stage to produce an aggregated gas stream having a temperature greater than the dew point of the aggregated gas.

2. A method according to claim 1, wherein said first gas stream takes up from 5% to 50% of aggregate gas stream.

3. A method of wetting particles contained in a gas stream comprising alkaline particles and gaseous sulfur oxides, comprising:
   separating a primary gas stream containing said alkaline particles and said sulphur oxides into first and second gas streams such that said first gas stream includes substantially all the particles in the primary gas stream;
   wetting the alkaline particles in said first gas stream with water in a wetting stage to form a reaction product capable of reacting with the sulfur oxides in the gaseous phase, the amount of water which is introduced into said wetting stage exceeding that amount of water which is capable of reducing the temperature of said first gas stream below its dew point; and
   combining the resulting first and second gas streams into an aggregate gas stream downstream of said wetting stage to react the reaction product of water and alkaline particles with sulfur oxides in the entire aggregate gas stream.

4. A method according to claim 13, wherein said first gas stream takes up from 5% to 50% of aggregate gas stream.

5. An apparatus for wetting particles contained in a gas stream including particles and gas, said apparatus comprising:
   separating means for receiving and separating a primary gas stream containing said particles into first and second gas streams such that said first gas stream includes substantially all the particles of the primary gas stream;
   wetting means in communication with said separating means for wetting the particles in said first gas stream with water in a wetting stage, the amount of water which is introduced into said wetting stage exceeding that amount of water which is capable of reducing the temperature of said first gas stream below its dew point; and
   combining means also in communication with aid separating means for combining the resulting first gas stream with wet particles and second gas stream into an aggregate gas stream downstream of said wetting stage to produce an aggregated gas stream having a temperature greater than the dew point of the aggregated gas.

6. An apparatus according to claim 5, wherein said means for wetting said first gas stream comprises at least one nozzle.

7. An apparatus according to claim 6, wherein said separator means comprises a louver separator.

* * * * *